a corporation of Delaware
No Drawing. Filed Sept. 23, 1963, Ser. No. 310,876
12 Claims. (Cl. 260—45.9)

3,331,812
STABILIZED COMPOSITIONS
Yoon Chai Lee and Speros P. Nemphos, Springfield, Mass., assignors to Monsanto Company, St. Louis, Mo., a corporation of Delaware
No Drawing. Filed Sept. 23, 1963, Ser. No. 310,876
12 Claims. (Cl. 260—45.9)

This invention relates to unsaturated nitrile polymers and more particularly relates to the stabilization of such polymers against discoloration.

The presence of a combined unsaturated nitrile, such as acrylonitrile, methacrylonitrile, etc., in a polymer is known to contribute valuable properties to the polymer. However, as is well known, the unsaturated nitrile present in the polymer has a tendency to discolor it, particularly when the polymer is subjected to the elevated temperatures required for molding and extrusion operations.

An object of the invention is to provide novel unsaturated nitrile polymer compositions having a reduced tendency toward discoloration.

Another object is to provide processes for stabilizing unsaturated nitrile polymers against discoloration.

These and other objects are attained by intimately mixing an unsaturated nitrile polymer (i.e., a polymer containing at least 10% by weight of a combined unsaturated nitrile of the group consisting of acrylonitrile, methacrylonitrile, ethacrylonitrile, propacrylonitrile, butacrylonitrile, and mixtures thereof) with about 0.01–5% by weight of an alkylphenol and about 0.05%–0.5% by weight of a beta-hydroxyalkylamine corresponding to the formula:

$$R-\underset{\underset{R'}{|}}{N}-R''$$

wherein R, R', and R'' are independently selected from the group consisting of —CH$_2$CH$_2$OH and

—CH$_2$CHOHCH$_3$

The following examples are given to illustrate the invention. Unless otherwise specified, quantities mentioned are quantities by weight.

EXAMPLE I

Part A—Control

Dissolve about 0.03 part of di-t-butyl peroxide in a monomer mixture consisting of 70 parts of styrene and 30 parts of acrylonitrile. Purge the reaction vessel with nitrogen. Heat the reaction mixture at 125° C. for 3 hours and at 140° C. for 3.5 hours to form a styrene/acrylonitrile copolymer. Age the copolymer at 200° C. for 6 hours.

Part B

Prepare three aged styrene/acrylonitrile copolymers by repeating Part A except for also dissolving, respectively, (1) 0.02 part of 2,6-di-t-butyl-p-cresol (DTBPC), (2) 0.1 part of triisopropanolamine (TIPA), and (3) 0.1 part of TIPA and 0.02 part of DTBPC in the monomer mixtures.

Part C

Determine the stabilizing effects of the additives of Part B by (1) dissolving 2 grams of each of the copolymers of Parts A and B in 50 ml. of chloroform, (2) measuring the percentage of light transmitted through each of the solutions at 380 mu, 400 mu, and 420 mu, (3) calculating the stabilizing effects of the additives in accordance with the equations:

$$\text{Stabilizing effect (380 mu)} = \frac{100\ (Y-Z)}{Z}$$

$$\text{Stabilizing effect (400 mu)} = \frac{100\ (W-X)}{X}$$

$$\text{Stabilizing effect (420 mu)} = \frac{100\ (U-V)}{V}$$

wherein Z, X, and V represent the percentages of light transmitted through the solution of the copolymer of Part A at 380 mu, 400 mu, and 420 mu, respectively, and Y, W, and U represent the percentages of light transmitted through a solution of a copolymer of Part B at 380 mu, 400 mu, and 420 mu, respectively, and (4) calculating the average of the three stabilizing effects of each additive. The average stabilizing effects of the additives of Part B are shown below.

| Additive: | Stabilizing effect |
|---|---|
| 0.02 DTBPC | 159 |
| 0.1 TIPA | 21 |
| 0.1 TIPA/0.02 DTBPC | 276 |

As demonstrated above, the stabilizing effect of a mixture of 2,6-di-t-butyl-p-cresol and triisopropanolamine is about 53% higher than the cumulative stabilizing effects of its components. Similar results are observed when mixtures of (1) 0.05 part of triisopropanolamine and 0.03 part of 2,6-di-t-butyl-p-cresol, (2) 0.15 part of triisopronanolamine anf 0.02 part of 2,6-d-t-butyl-p-cresol, (3) 0.2 part of triisopropanolamine and 0.03 part of 2,6-di-t-butyl-p-cresol, and (4) 0.3 part of triisopropanolamine and 0.02 part of 2,6-di-t-butyl-p-cresol are used to stabilize the styrene/acrylonitrile copolymer.

EXAMPLE II

Part A—Control

Charge 200 parts of water, 67 parts of styrene, 33 parts of acrylonitrile, about 0.03 part of di-t-butyl peroxide, and about 0.03 part of a water-soluble acrylic acid/2-ethylhexyl acrylate (93.2:6.8) copolymer to a suitable, agitated reaction vessel. Pressurize the reaction mixture with nitrogen and heat at 120–150° C. for about 8 hours to copolymerize the monomers. Filter, and then wash and dry the styrene/acrylonitrile copolymer beads.

Part B

Repeat Part A except for also including 0.02 part of 2,6-di-t-butyl-p-cresol and 0.15 part of triisopropanolamine in the charge to the reaction vessel.

Part C

Mold two 0.15 inch-thick specimens of each of the copolymers of Parts A and B. Form Specimen I of each of the copolymers by extruding the copolymer beads at about 205° C. and injection molding the extruded pellets at about 200° C. Form Specimen II of each of the copolymers by extruding the copolymer beads at about 205° C., twice re-extruding at 260° C., and injection molding the extruded pellets at about 200° C. Measure the reflectance of light of each of the specimens at 700 mu, 500 mu, and 420 mu, and calculate the three-point yellowness of the specimen in accordance with the equation:

$$3PY = 2R_{700} - (R_{500} + R_{420})$$

wherein 3PY represents the three-point yellowness value and $R_{700}$, $R_{500}$, and $R_{420}$ represent the reflectances at 700 mu, 500 mu, and 420 mu, respectively.

Part D

Calculate the color stabilizing effects of the additives of Part B in accordance with the equations:

$$\text{Stabilizing effect I} = \frac{100\ (Y-Z)}{Y}$$

Stabilizing effect II $= \dfrac{100\,(W-X)}{W}$ wherein Y and W represent the respective three-point yellowness values of Specimens I and II of the copolymer of Part A, and Z and X represent the respective three-point yellowness values of Specimens I and II of the copolymer of Part B. Color stabilizing effect I is 20; color stabilizing effect II is 23.

*Part E*

Calculate the difference between the three-point yellowness values of Specimens I and II of each of the copolymers of Parts A and B. Then determine the heat stabilizing effect of the additive of Part B in accordance with the equation:

Heat stabilizing effect $= \dfrac{100\,(Y-Z)}{Y}$ wherein Y represents the difference between the three-point yellowness values of Specimens I and II of the copolymer of Part A, and Z represensts the difference detween the three-point yellowness values of Specimens I and II of the copolymer of Part B. The heat stabilizing effect of the additive is 26.

The preceding examples demonstrate the effectiveness of triisopropanolamine/2,6-di-t-butyl-p-cresol mixtures in stabilizing styrene-acrylonitrile copolymers against discoloration. Similar stabilizing effects are observed when:

(1) The stabilizer is intimately mixed with a preformed unsaturated nitrile polymer instead of being incorporated into the monomer charge employed in preparing the unsaturated nitrile polymer, (2) The polymer being stabilized is polyacrylonitrile, polymethacrylonitrile, a styrene/acrylonitrile (50:50) copolymer, a styrene/methacrylonitrile (85:15) copolymer, an alpha-methylstyrene/acrylonitrile (80:20) copolymer, a styrene/alpha - methylstyrene/acrylonitrile (50:40:10) terpolymer, or a styrene/acrylonitrile/N-t-butyl acrylamide (70:20:10) terpolymer, (3) The triisopropanolamine is replaced with triethanolamine, diethanolmonoisopropanolamine, or diisopropanolmonoethanolamine, or (4) The 2,6-di-t-butyl-p-cresol is replaced with 2,2'-methylene-bis(6-t-butyl-p-cresol), 4,4'-butylidene-bis (6-t-butyl-m-cresol), 2-t-butyl-4-phenylphenol, 2,6 - dibenzyl-p-cresol, 2,6-diisopropylphenol, 2-t-butyl-p-cresol, or 2,6-di-t-butyl-hydroquinone.

A preferred embodiment of the invention is its application to the stabilization of acrylonitrile polymers, particularly monovinylidene aromatic hydrocarbon/acrylonitrile interpolymers containing about 15–50% by weight of combined acrylonitrile. Such interpolymers include those which contain no combined monomers other than acrylonitrile and one or more monovinylidene aromatic hydrocarbons as well as those which also contain a minor amount, e.g., up to about 20% by weight, of one or more combined comonomers such as the alkyl (alk)acrylate, acrylamide, and dialkyl maleate and fumarate comonomers exemplified above.

The beta-hydroxyalkylamines which are employed as components of the stabilizer mixtures of the invention are compounds which correspond to the formula:

wherein R, R', and R" are independently selected from the group consisting of —CH$_2$CH$_2$OH and

—CH$_2$CHOHCH$_3$ i.e., triisopropanolamine, triethanolamine, diethanolmonoisopropanolamine, diisopropanolmonoethanolamine, and mixtures thereof. Triisopropanolamine is especially preferred. This component is employed in concentrations of 0.05–0.5%, preferably 0.05–0.3%, based on the weight of the unsaturated nitrile polymer.

The alkylphenols employed as components of the stabilizer mixtures of the invention are aromatic compounds which have at least one hydroxyl group and at least one alkyl group attached to a benzene nucleus. This component is ordinarily employed in concentrations of about 0.01–0.1%, based on the weight of the unsaturated nitrile polymer. Up to about 5% of the alkylphenol may be employed when it is mixed with a preformed unsaturated nitrile polymer, but these higher concentrations of alkylphenol are usually undesirable when it is incorporated into a monomer charge which is to be polymerized to form an unsaturated nitrile polymer. Alkylphenols suitable for use in the practice of the invention include, e.g.:

2,2'-methylene-bis(6-t-butyl-p-cresol)
2,2'-methylene-bis(6-t-butyl-4-ethylphenol)
2,2'-methylene-bis(4-methyl-6-(1,1,3,3-tetramethyl-butyl)phenol)
4,4'-thio-bis(6-t-butyl-m-cresol)
4,4'-butylidene-bis(6-t-butyl-m-cresol)
2,2'-methylene-bis(4,6-dimethylphenol)
2-t-butyl-4-(4-t-butylphenyl)phenol
2-t-butyl-4-phenylphenol
2,6-dibenzyl-p-cresol
2-benzyl-p-cresol
2-benzyl-6-t-butyl-p-cresol
2-benzyl-6-t-butyl-4-ethylphenol
2,4-dimethyl-6-(1-methyl-1-cyclohexyl)phenol
2,6-diisopropyl-p-cresol
2,4-dimethyl-6-isopropylphenol
2-t-butyl-4,6-dimethylphenol
2-t-butyl-p-cresol
2-(1,1,3,3-tetramethylbutyl)-p-cresol
2,4,6-trimethylphenol
2,6-di-t-butyl-p-cresol
2,6-di-t-butyl-4-ethylphenol
2,6-diisopropylphenol
2,6-di-t-butyl-4-phenylphenol
2,6-di-t-butyl-4-(4-t-butylphenyl)phenol
2,5-di-t-butylhydroquinone
2,5-di-t-amylhydroquinone, etc.

The stabilizer mixtures of the invention can be incorporated into the unsaturated nitrile polymers by any technique which permits their uniform distribution throughout the polymers, e.g., by blending them with preformed unsaturated nitrile polymers on a two roll mill or other suitable mixing device, by adding them to the monomer charge which is to be polymerized to form an unsaturated nitrile polymer, etc. According to a preferred embodiment of the invention, the stabilizer mixtures are added to a polymerizable material containing at least 10% by weight of an unsaturated nitrile, and the polymerizable material is then polymerized by any desired conventional technique, e.g., by heating the polymerizable material at a temperature in the range of about 50–200° C. using a mass, solution, emulsion, suspension, batch, or continuous polymerization technique.

When desired, the stabilized compositions of the invention can contain optional additives such as plasticizers, lubricants, colorants, rubbery polymers, etc., which are sometimes added to the polymeric compositions and, in other cases, e.g., when grafting onto a rubber backbone is desired, are incorporated into the polymerizable material comprising the unsaturated nitrile.

It is obvious that many variations can be made in the products and processes set forth without departing from the spirit and scope of this invention.

What is claimed is:

1. A composition which comprises a non-elastomeric, resinous unsaturated nitrile polymer containing at least 10% by weight of a combined unsaturated nitrile of the group consisting of acrylonitrile, methacrylonitrile, ethacrylonitrile, propacrylonitrile, butacrylonitrile, and mixtures thereof, said nitrile polymer being selected from the class consisting of homopolymers of the nitriles of said group, interpolymers of the nitriles of said group with each other and interpolymers of the nitriles of said group with monovinylidene aromatic hydrocarbons alone and in combination with up to 20 percent by weight of monomers of the group consisting of alkyl acrylates, alkyl, alkacrylates, acrylamides, dialkyl maleates and dialkyl fumarates in intimate admixture with about 0.01–5% by weight of an alkylphenol and about 0.05–0.5% by weight of a beta-hydroxyalkylamine corresponding to the formula:

$$R-\underset{\underset{R'}{|}}{N}-R''$$

wherein R, R′, and R″ are independently selected from the group consisting of —CH$_2$CH$_2$OH and

—CH$_2$CHOHCH$_3$

2. The composition of claim 1 wherein the combined unsaturated nitrile is acrylonitrile.

3. The composition of claim 1 wherein the unsaturated nitrile polymer is a monovinylidene aromatic hydrocarbon/acrylonitrile interpolymer containing about 15–50% by weight of combined acrylonitrile.

4. The composition of claim 3 wherein the monovinylidene aromatic hydrocarbon/acrylonitrile interpolymer is a styrene/acrylonitrile copolymer.

5. The composition of claim 3 wherein the monovinylidene aromatic hydrocarbon/acrylonitrile interpolymer is an alpha-methylstyrene/acrylonitrile copolymer.

6. The composition of claim 3 wherein the monovinylidene aromatic hydrocarbon/acrylonitrile interpolymer is a styrene/alpha-methylstyrene/acrylonitrile terpolymer.

7. The composition of claim 1 wherein the alkylphenol is 2,6-di-t-butyl-p-cresol.

8. The composition of claim 1 wherein the beta-hydroxyalkylamine is triisopropanolamine.

9. The composition of claim 1 wherein the concentration of the alkylphenol is in the range of about 0.01–0.1%, based on the weight of the polymer.

10. The composition of claim 1 wherein the concentration of the beta-hydroxyalkylamine is in the range of about 0.05–0.3%, based on the weight of the polymer.

11. A composition which comprises a monovinylidene aromatic hydrocarbon/acrylonitrile interpolymer containing about 15–50% by weight of combined acrylonitrile in intimate admixture with about 0.01–0.1% by weight of 2,6-di-t-butyl-p-cresol and about 0.05–0.3% by weight of triisopropanolamine.

12. A process which comprises intimately mixing (a) about 0.01–0.1 part by weight of an alkylphenol and (b) about 0.05–0.3 part by weight of a beta-hydroxyalkylamine which corresponds to the formula:

$$R-\underset{\underset{R'}{|}}{N}-R''$$

wherein R, R′, and R″ are independently selected from the group consisting of —CH$_2$CH$_2$OH and

—CH$_2$CHOHCH$_3$ with 100 parts by weight of a polymerizable material comprising an unsaturated nitrile of the group consisting of acrylonitrile, methacrylonitrile, ethacrylonitrile, propacrylonitrile, butacrylonitrile, and mixtures thereof with each other and with monovinylidene aromatic hydrocarbons alone or in combination with monomers selected from the group consisting of alkylacrylates, alkyl alkacrylates, acrylamides, dialkyl maleates and dialkyl fumarates, said unsaturated nitriles comprising at least 10 percent by weight of said polymerizable material, and heating to polymerize the polymerizable material to a non-elastomeric, resinous polymer.

References Cited

UNITED STATES PATENTS

| 2,654,679 | 10/1953 | Goppel et al. | 260—45.9 |
| 2,681,328 | 6/1954 | Stanton et al. | 260—45.9 |
| 2,829,121 | 4/1958 | Leeper | 260—45.9 |
| 2,984,648 | 5/1961 | Williams et al. | 260—45.95 |
| 3,092,609 | 6/1963 | Kostelitz et al. | 260—45.9 |

FOREIGN PATENTS 739,650  11/1955  Great Britain.

DONALD E. CZAJA, *Primary Examiner.*

LEON J. BERCOVITZ, *Examiner.*

H. E. TAYLOR, *Assistant Examiner.*